US009922225B2

(12) United States Patent
Likar

(10) Patent No.: US 9,922,225 B2
(45) Date of Patent: Mar. 20, 2018

(54) CLOUD-BASED AUTHENTICATION OF USER DEVICES FOR ONBOARDING TO A WI-FI NETWORK

(71) Applicant: CLOUDMONDO, INC., Santa Clara, CA (US)

(72) Inventor: Bojan Likar, Cupertino, CA (US)

(73) Assignee: CLOUDMONDO, INC., Santa Clara, CA (US)

(*) Notice: Subject to any disclaimer, the term of this patent is extended or adjusted under 35 U.S.C. 154(b) by 0 days.

(21) Appl. No.: 15/476,879

(22) Filed: Mar. 31, 2017

(65) Prior Publication Data

US 2017/0300732 A1 Oct. 19, 2017

Related U.S. Application Data

(63) Continuation-in-part of application No. 15/255,734, filed on Sep. 2, 2016.

(60) Provisional application No. 62/219,132, filed on Sep. 16, 2015.

(51) Int. Cl.

| G06K 5/00 | (2006.01) |
| G06K 7/10 | (2006.01) |
| G06K 7/14 | (2006.01) |
| H04W 12/06 | (2009.01) |
| G06K 19/06 | (2006.01) |
| H04L 29/06 | (2006.01) |

(52) U.S. Cl.
CPC ..... *G06K 7/1417* (2013.01); *G06K 19/06037* (2013.01); *H04L 63/0876* (2013.01); *H04W 12/06* (2013.01)

(58) Field of Classification Search
USPC ................................. 235/382, 462.01, 462.09
See application file for complete search history.

(56) References Cited

U.S. PATENT DOCUMENTS

| 2012/0254240 | A1* | 10/2012 | Mariotti | H04W 4/206 |
| | | | | 707/770 |
| 2013/0016710 | A1* | 1/2013 | Shinohara | H04M 1/7253 |
| | | | | 370/338 |
| 2013/0221083 | A1* | 8/2013 | Doss | H04W 12/04 |
| | | | | 235/375 |
| 2014/0026192 | A1* | 1/2014 | Gatewood | H04L 63/20 |
| | | | | 726/4 |
| 2014/0313542 | A1* | 10/2014 | Benchorin | G06F 3/1292 |
| | | | | 358/1.15 |
| 2015/0222615 | A1* | 8/2015 | Allain | H04L 63/08 |
| | | | | 726/4 |

(Continued)

*Primary Examiner* — Tuyen K Vo
(74) *Attorney, Agent, or Firm* — Law Office of Dorian Cartwright; Dorian Cartwright

(57) ABSTRACT

Cloud-based authentication is provided for additional user stations of a user once a trusted user station has been established. Responsive to a match in a common QR-code received from the trusted user station and a second user station, one or more access points associated with the user is identified. The second station is associated with the user and with the one or more access points including sending credentials for authorizing the second station with the one or more access points. When a subsequent request for network access from the second station at the one or more access points, Wi-Fi services are automatically provided from the one of more access points to the second user station, without requiring the second user station to enter authentication credentials.

13 Claims, 6 Drawing Sheets

(56) References Cited

U.S. PATENT DOCUMENTS

2015/0230085 A1* 8/2015 Xue ................ G06F 17/30725
  726/6
2016/0050565 A1* 2/2016 Benoit ................ H04W 12/06
  726/9

* cited by examiner

CLOUD-BASED AUTHENTICATION OF USER DEVICES FOR ONBOARDING TO A WI-FI NETWORK

CROSS-REFERENCE TO RELATED APPLICATIONS

This application claims the benefit of priority as a continuation-in-part under 35 U.S.C. 120 to U.S. application Ser. No. 15/255,734, filed Sep. 2, 2016, entitled CLOUD-BASED FRIEND ONBOARDING FOR WI-FI NETWORK COMMUNICATION AUTHENTICATION, by Bojan LIKAR, et al. which in turn claims priority to U.S. Application No. 62/219,132, filed Sep. 16, 2016, entitled CLOUD-BASED FRIEND ONBOARDING FOR WI-FI NETWORK COMMUNICATION AUTHENTICATION, the contents of each being hereby incorporated by reference in its entirety.

FIELD OF THE INVENTION

The invention relates generally to computer networking, and more specifically, to automatic cloud-based authentication of multiple stations of a user for onboarding to a Wi-Fi network.

BACKGROUND

The mobility of computerized devices through Wi-Fi and other innovations has manifested more demand for mobility in computerized devices. To this end, ubiquitous networking would permit a wireless connection to the Internet anytime, anywhere, and from any device.

Unfortunately, the risk of malicious users and otherwise undesirable users hinders completely open networks. On the other hand, the inconvenience of security authentications, such as Wi-Fi credentials needed for onboarding to a local network, burdens benign users. For example, credentials are manually entered to an access point or similar type of device in order to gain Wi-Fi connectivity. The inconvenience of inputting credentials on a cell phone is made worse by the complex nature of credentials (e.g., use of caps and symbols).

Further, many users access Wi-Fi with several different devices, such a smart phone, a PC, a laptop, a tablet, a smart watch, a video game console, entertainment systems, appliances, and more.

What is needed is a robust technique for cloud-based authentication of several stations of users for simplified onboarding to a Wi-Fi or other type of network.

SUMMARY

The shortcomings of the prior art are addressed by methods, (non-transitory) computer program products, and systems for cloud-based authentication of several stations of users for simplified onboarding to a Wi-Fi or other type of network.

In one embodiment, a QR-code is received from a first user station. The first station is authorized with the Wi-Fi onboarding server on behalf of the user. Also, a scan of a unique QR code is received from a second station of the user as displayed on the first station of the user.

In another embodiment, the QR-code from the first user station is determined to match the QR-code scan of the second user station. The match is interpreted as an indication that the second user station should also be associated with the user.

In yet another embodiment, responsive to the QR-code match determination, one or more access points associated with the user is identified. The second station is associated with the user and with the one or more access points, including sending credentials for authorizing the second station with the one or more access points. When there is a subsequent request for network access from the second station at the one or more access points, Wi-Fi services are automatically provided from the one of more access points to the second user station, without requiring the second user station to enter authentication credentials.

Advantageously, easier network access for mobile devices improves performance of the devices and the usefulness of mobile devices to users.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, (non-transitory) computer program products, and systems for cloud-based authentication of several stations of users simplified onboarding to a Wi-Fi or other type of network, are described herein.

The described techniques can apply to a user that controls an access point and wants to authenticate additional devices to the access point, without the hassle of entering authentication credentials for each device. However, one of ordinary skill in the art will recognize variations to the disclosed embodiments that are contemplated, although not explicitly described. For instance, other type of networking devices bedsides Wi-Fi devices can be configured for user device onboarding (e.g., Bluetooth, audio, NFC, Zigbee or Z-Wave networks rather than or in conjunction with Wi-Fi networks).

Figure 2:
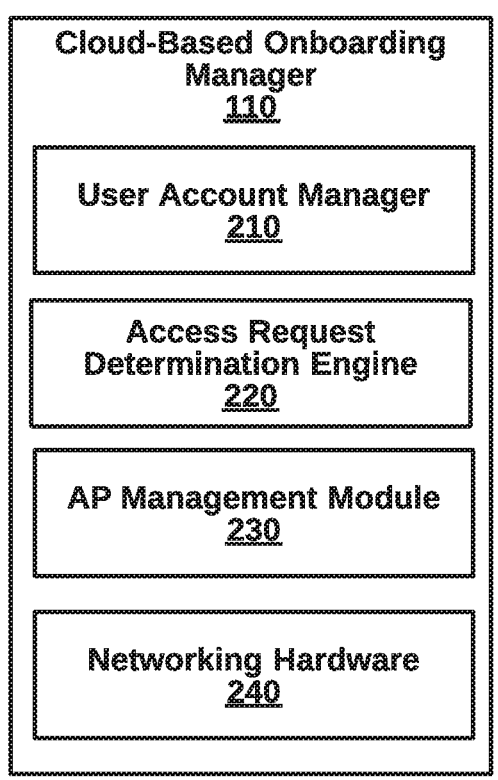
FIG. 2 is a more detailed block diagram illustrating a cloud-based Wi-Fi onboarding manager of FIG. 1, according to one embodiment.
Figure 3:
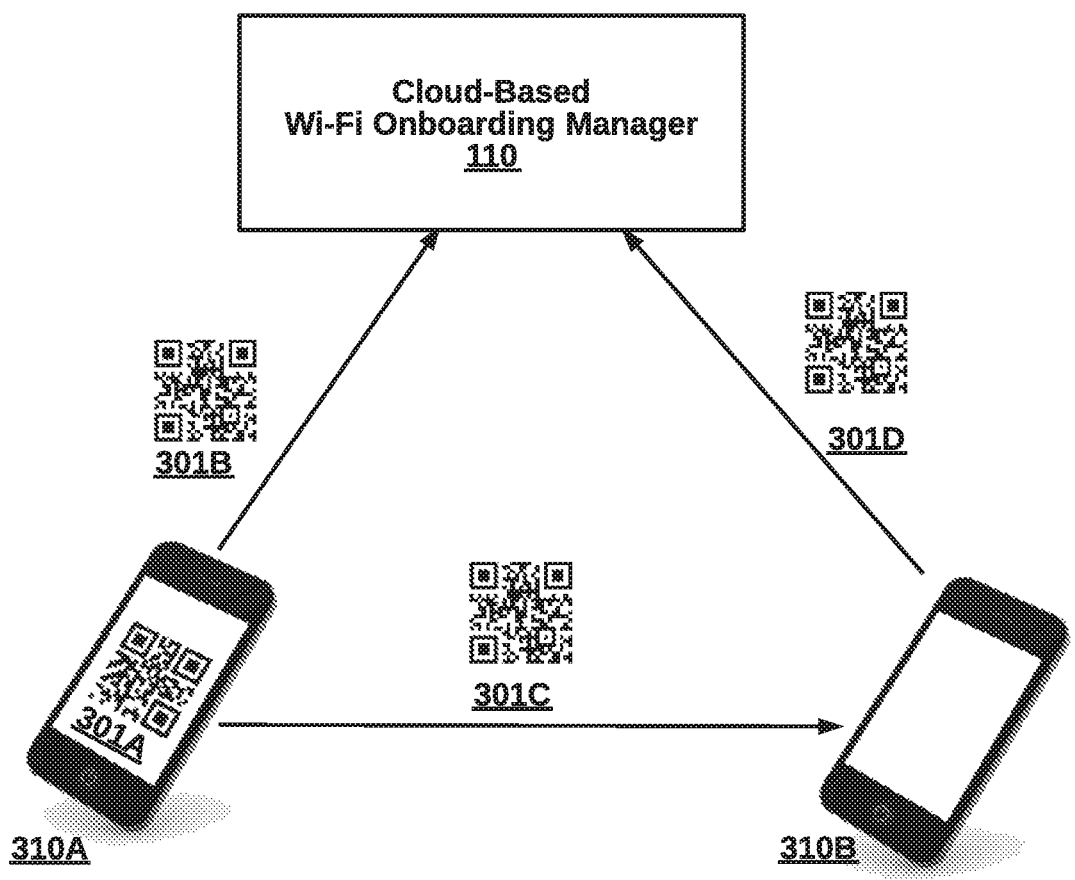
FIG. 3 is a sequence diagram illustrating interactions between components of the system in FIG. 1, according to one embodiment.

I. Systems for Additional User Device Onboarding (FIGS. 1-3)

Figure 1:
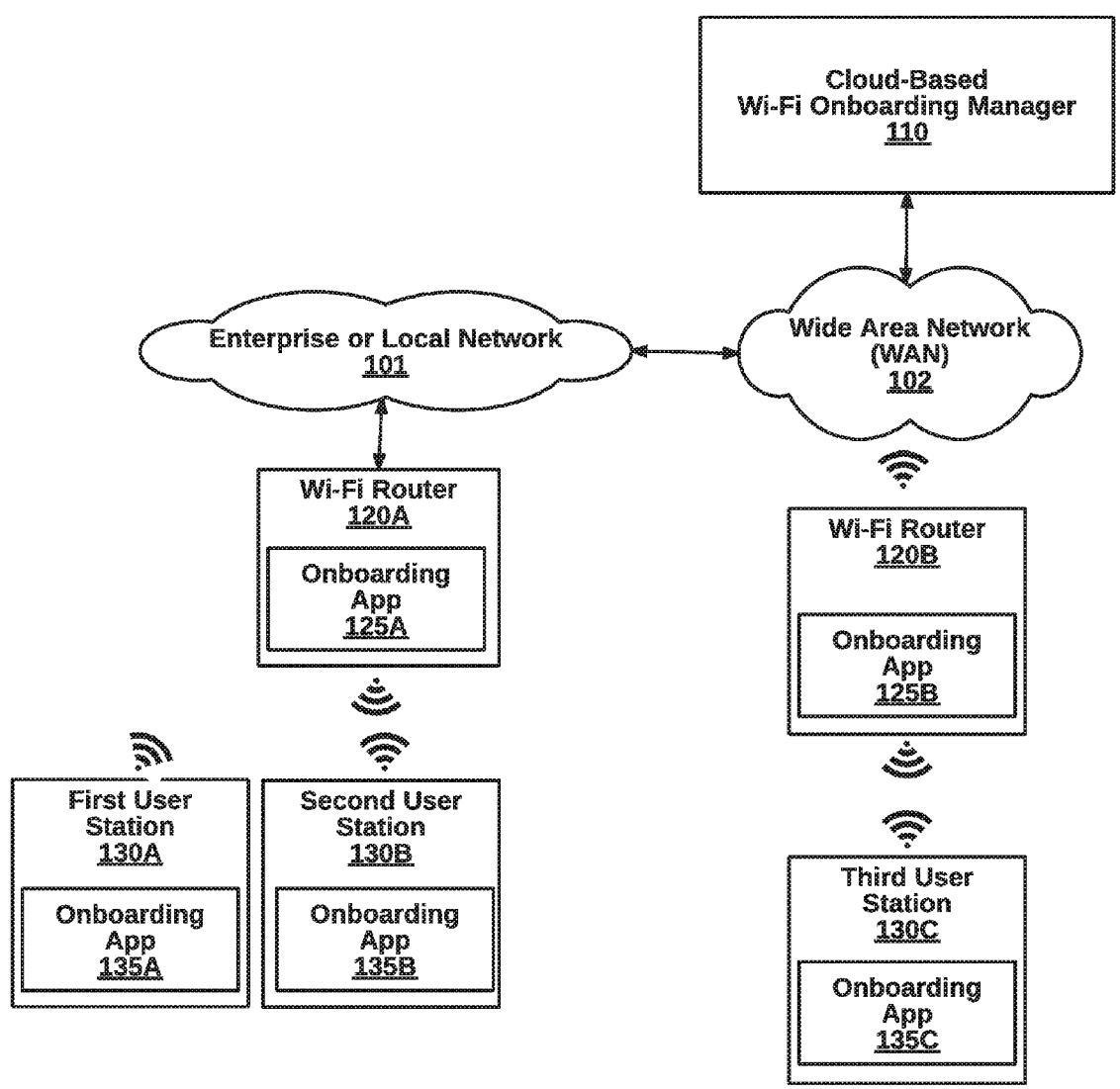
FIG. 1 is a high-level block diagram illustrating a system for cloud-based authentication of several stations of users for onboarding to a Wi-Fi or other type of network, according to one embodiment.

FIG. 1 is a high-level block diagram illustrating a system 100 for cloud-based authentication of several stations of users for onboarding to a Wi-Fi or other type of network, according to one embodiment. The system 100 comprises a cloud-based Wi-Fi onboarding manager 110, Wi-Fi routers 120A-B, and stations 130A-C. Additional network components can also be part of the system 100, such as firewalls, virus scanners, routers, switches, application servers, databases, as well as additional controllers, access points, access switches, stations, and the like. The network components can be implemented as hardware, software, or a combination of both. The system 100 can be implemented on a home network with a single router, a business with several different physical locations, or at hot spots, for instance.

The user stations 130A-B are shown wirelessly connected to Wi-Fi router 120A which in turn has a wired connection to enterprise network 101. Similarly, user station 130C is shown wirelessly connected to Wi-Fi router 120B which in turn has a wireless connection to a wide area network (WAN) 102 (e.g., the Internet). Also, the cloud-based Wi-Fi onboarding manager 110 can be an external component with a wired connection to the WAN 102. Many alternative embodiments are possible including the cloud-based Wi-Fi onboarding manager being coupled within the enterprise network 101. Finally, the WAN 102 and the enterprise network 101 are coupled in communication and facilitate protocol-specific data transfers in the form of frames. The networks 101, 102 can be a LAN, WAN, the Internet, a cloud-based network, a data network, a cellular network, a hybrid network, or the like.

The Wi-Fi cloud based onboarding manager 110 can service the stations 130A-C for access to the enterprise network 101 or the WAN 120, as allowed by onboarding apps 125A-B. The second and third stations 130B-C can be easily granted access via the first user station 130A which is already authenticated with user network services. In an embodiment, the first station 130A is authenticated to the cloud-based onboarding manager 110.

In an embodiment, the Wi-Fi cloud based onboarding manager 110 begins authentication of the second and third stations 130B-C when a QR code generated by the second or third user stations 130A-B is scanned by the first user station 130A, and both the generated and scanned QR codes are sent. The QR codes are matches server-side to imply a connection between the devices. A user account is updated with new devices and identification data for the new devices are sent to the Wi-Fi routers 120-B, associated with a user. Subsequent connections to the Wi-Fi routers 120A-B by the second and third user stations 130-C are automatically authenticated for network services. One embodiment limits network access to predefined levels associated with a user of the first user station 130A. More detailed embodiments of the Wi-Fi cloud based onboarding manager 110 are described below with reference to FIG. 2.

In one embodiment, the Wi-Fi cloud based onboarding manager 110 comprises a standard server device executing software. The Wi-Fi cloud based onboarding manager 110 can be one device, a group of distributed devices, or a virtualized device. The Wi-Fi cloud based onboarding manager 110 can be operated by a service provider to many different owners having user profiles. Alternatively, the Wi-Fi cloud based onboarding manager 110 can be owned by an enterprise and deployed directly on the enterprise network 101. Moreover, the Wi-Fi cloud based onboarding manager 110 can be part of, or work in conjunction with, a controller for access points.

In an embodiment, the Wi-Fi routers 120A-B comprise home networking router by Netgear, Linksys or as provided by an ISP (Internet Service Provider). In another embodiment, the Wi-Fi router 120 comprises a commercial grade access point. In still other embodiments, the mobile stations indirectly connect to the Wi-Fi routers 120A-B and first connect to a repeater or other peripheral device in a mesh network. One implementation of the Wi-Fi routers 120A-B includes an onboarding app 125 to implement processes of the Wi-Fi cloud based onboarding manager 110. To provide network service, in one embodiment, the Wi-Fi routers 120A-B comply with IEEE 802.11 protocols (promulgated by the Institute of Electrical and Electronics Engineers). Under IEEE 802.11, a beacon with one or more BSSIDs is periodically sent to advertise a presence for new connections and maintain current connections. Then the Wi-Fi routers 120A-B listens for packets addressed to associated BSSIDs and ignores packets addressed to unassociated BSSIDs. Furthermore, the Wi-Fi routers 120A-B forwards packets addressed to MAC (Media Access Control) addresses of associated stations.

While the Wi-Fi router 120A can be owned or controlled by a user while, in an embodiment, the Wi-Fi router 120B is authorized for the user, although not owned or controlled by the user. In more detail, the owner or controller of Wi-Fi 120B can allow access for the user station 130C using, for example, techniques described in U.S. Application No. 62/219,132. In turn, the user extends permission to additional owned devices.

The first user station 130A is utilized by an owner or a network administrator to configure the Wi-Fi cloud based onboarding manager 110 and provide authorization requests in real-time or otherwise. Specifically, in one embodiment, an owner of the Wi-Fi router 120A sets up a user profile which includes security information necessary to the first user connect station 130A to the Wi-Fi router 120A. Additionally, the first user station 130A becomes a tool for authenticating additional devices. To do so, a QR-code displayed by the second user station 130B is scanned by a camera of the first user station 130A associated with an onboarding app 135A. Using a secure channel (e.g., secured by log in credentials), the onboarding app 135A facilitates transmission of the QR-code or related data to the cloud based Wi-Fi onboarding manager 110 for processing.

The second and third user stations 130B-C are commonly owned or controlled by the same user as the first user station 130A. In one case, the user is an entity or institution (e.g., a business or government agency). The onboarding apps 135B-C are downloaded or are already part of the operating system. The onboarding apps 135B-C gather identification information, such as a MAC address, IP address, serial number, or the like, from the device hardware or operating system. A QR-code is generated which uses the identification information, so that when the onboarding apps 135B-C transmit to the cloud-based Wi-Fi onboarding manager 110, the QR-codes can be matched. In one implementation, the QR-code has its own identification embedded without device information, and the onboarding apps 135B-C transmit device identification information separately.

The user stations 130A-C can be mobile or stationary. An embodiment of the station 130 can be a smartphone (e.g., including iOS or Android operating system), a tablet or phablet device, a laptop device, or the like.

Generally, with respect to the onboarding apps 125A-C, 135, 145, many variations are possible, such mobile apps, streaming apps, desktop applications, and daemons. Preferably, an app is downloaded and installed to a device and can be updated as needed. The functions can be implemented in software, hardware, or a combination of both. Over time, some functionality may become integrated with operating systems, browsers, other apps, and the like, such that no app is needed or functionality is spread among the app and other software and hardware components.

FIG. 2 is a more detailed block diagram illustrating the cloud-based Wi-Fi onboarding manager 110 of FIG. 1, according to one embodiment. The cloud-based Wi-Fi onboarding manager 110 of this embodiment includes a user account manager 210, an access request determination engine 220, an AP management module 230, and networking hardware 240.

The user account manager 210 preconfigures associates trusted user devices with a user. Also, a user policy for additional device onboarding can be stored in the user account manager 210. For example, a policy implemented with rules can set up new devices with the same network access rights for all devices of a user. In another example, a policy can give different network access rights for different types of devices of the user. In yet another example, the policy may establish just temporary network access. A user policy for a user account of an entity can allow devices of different users to onboard new devices on behalf of the entity, but a specific user of the entity has a specific set of network access rights. Many other parameters are possible. In one embodiment, the user account is accessed through a user interface executing on a browser or an independent application.

The access request determination engine 220 responds in real-time to authentication requests for additional user devices. In one embodiment, a set of rules matches QR-code data received from a trusted user device over a secure channel to QR-code data received from an additional user device. To do so, QR-codes from various devices of various users can be received and queued until paired with a QR-code having a matching identification.

In response to matching QR-codes, the additional user devices themselves become trusted in an automatic manner. The trusted devices are then authenticated with associated access points, as discussed below, without having to enter credentials at the additional user device. The newly trusted devices can now be used, in some embodiments, to authenticate even more additional devices of a user. In one implementation, the identification information of the newly trusted device is stored in a corresponding user profile. In one embodiment, authentication credentials for a Wi-Fi router or access point are retrieved and sent on behalf of the newly trusted user device. Also, the identification information is sent for automatically configuring the newly trusted user device when requesting network access.

The AP management module 230, responsive to the positive identification, sends the identification information for the additional user devices to Wi-Fi access points and routers. An API allows direct communication to onboarding apps for instructions related to user devices. In one instance, a MAC is sent and stored so that when the newly trusted user device makes contact, no authentication credentials are requested. In another instance, credentials are downloaded to an onboarding app which presents the credentials on behalf of the user device. Many other log on techniques are possible.

The networking hardware 240 can comprise networking interface components such as Wi-Fi radios, Wi-Fi antennae, transceivers, coders and decoders, digital signal processors, and other supporting lower level hardware and processes necessary for communication across channels. The networking hardware 240 can support different variations of IEEE 802.11, including multiple input/multiple output (MIMO) and other techniques.

FIG. 3 is a sequence diagram illustrating interactions between components of the system in FIG. 1, according to one embodiment. The specific interactions shown in FIG. 3 and described below can be performed in different orders, can include many sub-interactions, and still be contemplated by the present disclosure. Moreover, the methods below of FIG. 4 further describe processes that are internal to the components, in addition to the external messages exchanged in FIG. 3.

User station 310A is an already known and trusted to cloud-based Wi-Fi onboarding manager 110. In order to extend trust to user station 310B, an onboarding app in user station 310A generates a QR-code 301A for display on a screen of the device. A copy of the QR code 301B, or representative data, is sent upstream to the cloud-based Wi-Fi onboarding manager 110.

Another part of the data flow is for user station 310B to scan a copy of the QR-code 301C using a camera communicatively coupled to an onboarding app. In turn, a copy of the QR-code 301D is also sent upstream from the user station 310B, along with a MAC address and any other appropriate data.

In an alternative embodiment, a reverse data path or otherwise sequenced data path can be implemented. For example, in a reverse data path, the user station 310B generates the QR-code which is copied by the user station 310A and then sent upstream for matching.

Generally, the QR-code is a type of matrix barcode that is a machine-readable optical label. A Reed-Solomon error correction process within the user station 310B can interpret the image when displayed by the user station 310A. The QR-code can embed information such as a unique identifier of the code itself. In the reverse data path scenario, the QR-code can embed a unique identifier of the user station 310B, such as a MAC address.

II. Methods for Additional User Device Onboarding
(FIGS. 4-5)

Figure 4:
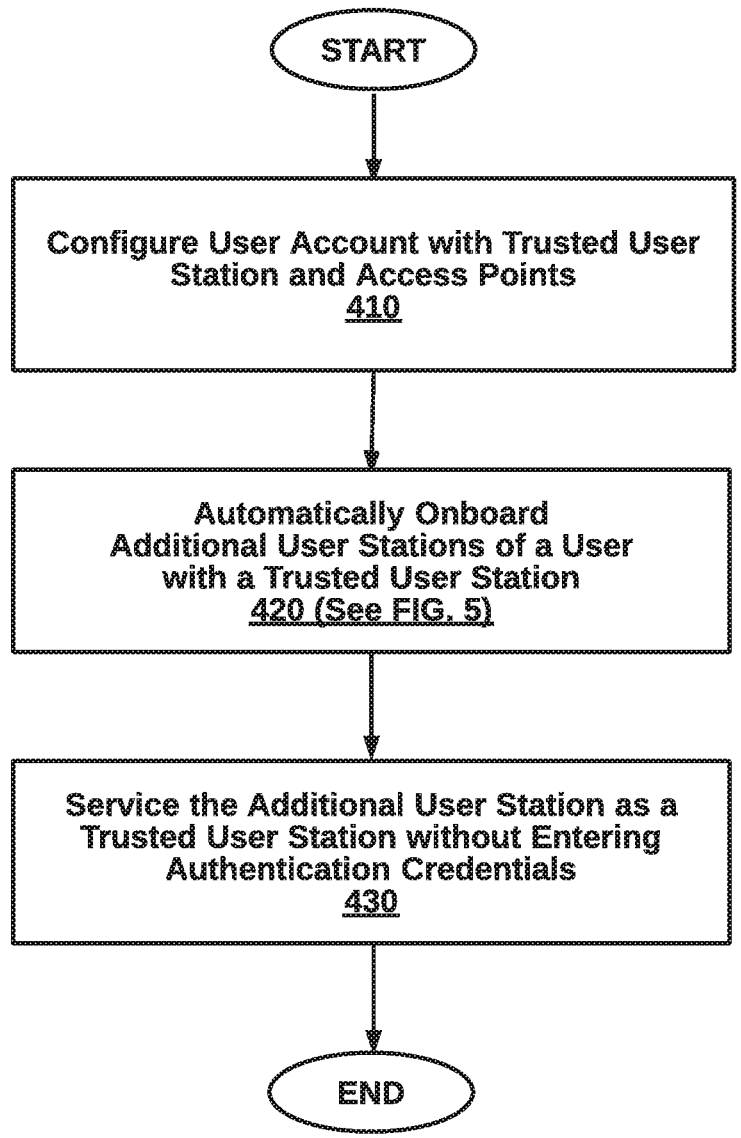
FIG. 4 is a flow chart illustrating a method for cloud-based authentication of several stations of users for onboarding to a Wi-Fi or other type of network, according to one embodiment.
Figure 5:
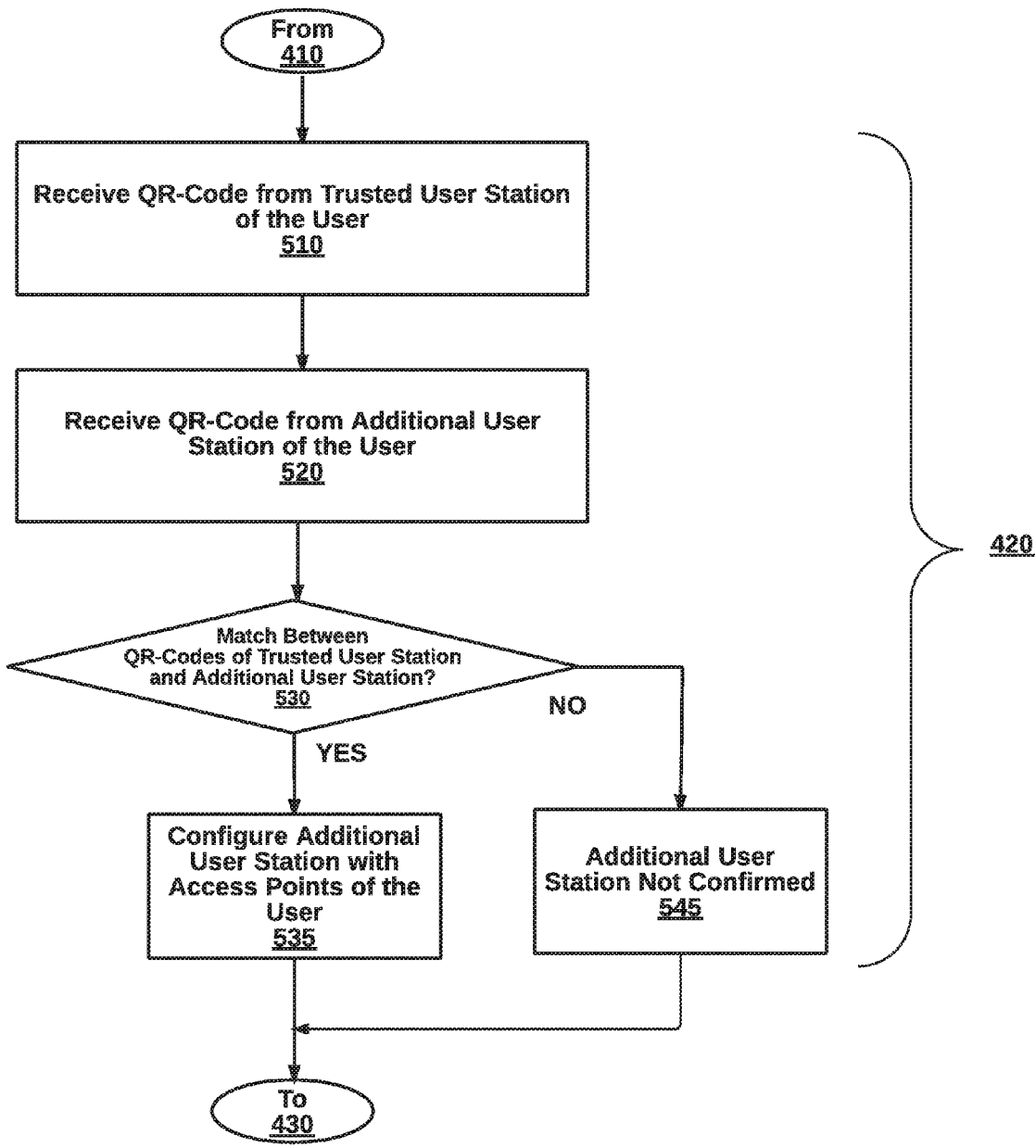
FIG. 5 is a more detailed flow chart illustrating a step of automatically onboarding additional user stations of a user with a trusted user station in the method of FIG. 4, according to some embodiments.

FIG. 4 is a block diagram illustrating a method 400 for friend onboarding for Wi-Fi network authentication, according to one embodiment.

A user account is configured with a trusted user station (step 410). Additional device onboarding policies can be established with a set of rules and saved in association with the user account. The user account can be secured by username and password credentials.

Additional user stations of a user are automatically onboarded with the trusted user station (step 420). Additional details for the automatically onboarding step 420 are described below in association with FIG. 5.

The additional user station is serviced by one or more access points as a trusted station without entering authentication credentials (step 430).

FIG. 5 is a more detailed flow chart illustrating the step 420 of automatically onboarding additional user stations of a user with a trusted user station in the method of FIG. 4, according to some embodiments.

A QR-code is received from a trusted user station of the user (step 510). A QR-code is also received from an additional user station of the user (step 520). One embodiment receives QR-codes to a queue, checking for a match in the queue for each incoming QR-codes. Another embodiment, saves the incoming QR-codes in association with a specific user account until a pairing is received.

If there is a match between the QR-codes of the trusted users station and the additional user station (step 530), the additional user station is configured with access points of the user (step 535). Otherwise, the additional user station is not confirmed (step 545).

III. Generic Computing Device (FIG. 6)

Figure 6:
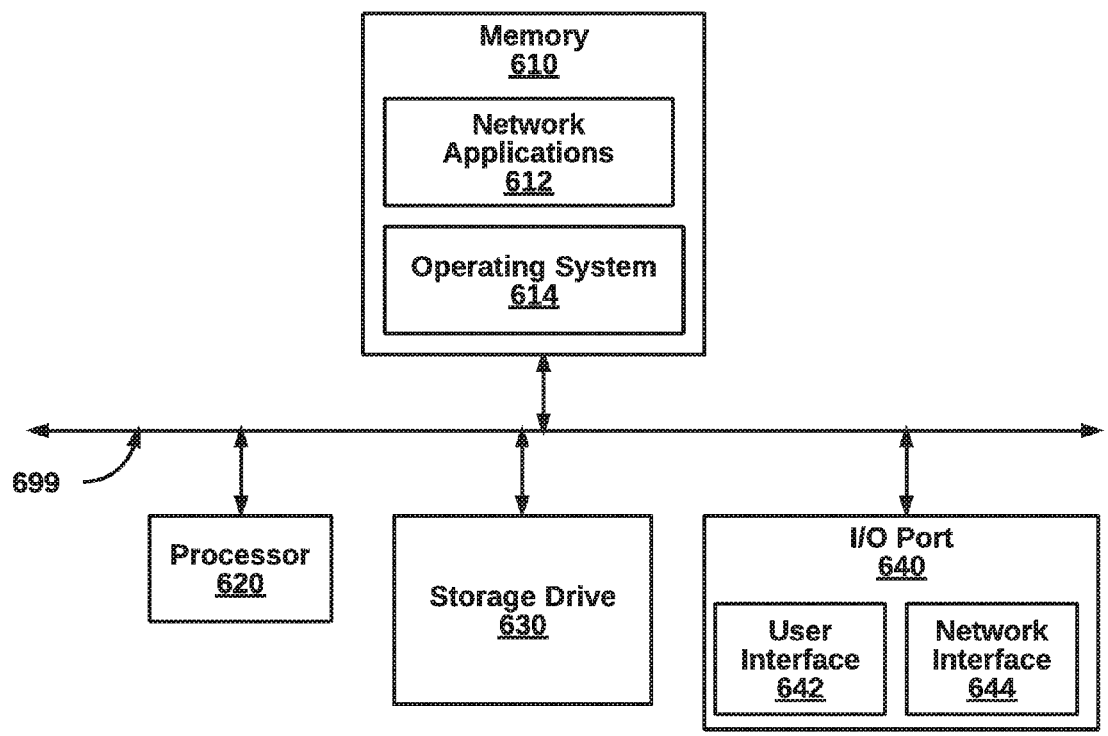
FIG. 6 is a block diagram illustrating an exemplary computing device for implementing the techniques described herein, according to one embodiment.

FIG. 6 is a block diagram illustrating an exemplary computing device 600 for use in the system 100 of FIG. 1, according to one embodiment. The computing device 600 is an exemplary device that is implementable for each of the components of the system 100, including the cloud-based Wi-Fi onboarding manager 110, the Wi-Fi routers 120A-B, and the user stations 130A-C. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the components illustrated in FIG. 1. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 8 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a cloud-based Wi-Fi onboarding server of a data communication system for onboarding additional stations with a user, implemented at least partially in hardware, the method comprising the steps of:

receiving a QR-code from a first user station, the first station being authorized with the Wi-Fi onboarding server on behalf of the user;

receiving a scan of a QR-code, from a second station of the user of a plurality of users, as displayed on the first station of the user, along with an identification of the second station;

determining that the QR-code from the first user station matches the QR-code scan of the second user station, as an indication that the second user station should also associated with the user;

responsive to the QR-code match determination, identifying one or more access points associated with the user;

associating the second station with the user and with the one or more access points including sending credentials for authorizing the second station with the one or more access points; and receiving a request for network access from the second station at the one or more access points, automatically allowing Wi-Fi services from the one of more access points to the second station.

2. The method of claim 1, further comprising:
associating the one or more access points with the user;
associating the first station with the user; and
configuring the first device with the one or more access points.

3. The method of claim 2, wherein the first station generates the QR code.

4. The method of claim 1, further comprising:
receiving data from the QR code from the second station.

5. The method of claim 1, wherein the step of automatically allowing Wi-Fi services comprises automatically allowing Wi-Fi services at a service level associated with the user of more than one possible service level.

6. The method of claim 1, wherein the first and second stations download applications for authorization with the Wi-Fi onboarding server.

7. The method of claim 1, wherein access to the one or more access points has been granted by a second user with control of the one or more access points.

8. The method of claim 1, wherein the QR code embeds a unique identifier of the second station.

9. The method of claim 1, wherein the QR code embeds a MAC address of the second station.

10. The method of claim 1, wherein the step of automatically allowing Wi-Fi services from the one or more access points to the second station occurs without sending authentication data from the second station.

11. The method of claim 1, further comprising:
updating authentication data required for the one or more access points; and
automatically updating authorization for the second station.

12. The method of claim 1, further comprising:
receiving an identification of the second user station from the second station, along with the QR-code scan.

13. A non-transitory computer program product storing source code that, when executed by a processor, performs a computer-implemented method in a cloud-based Wi-Fi onboarding server of a data communication system, implemented at least partially in hardware, the method comprising the steps of:

receiving a scan of a unique QR code from a second station of a user of a plurality of users as displayed on a first station of the user, the first station being authorized with the Wi-Fi onboarding server on behalf of the user;

identifying the second station from the unique QR code;

identifying one or more access points associated with the user;

associating the second station with the user and with the one or more access points including sending credentials for authorizing the second station with the one or more access points; and receiving a request for network access from the second station at the one or more access points, automatically allowing Wi-Fi services from the one of more access points to the second station.

* * * * *